United States Patent
Sloan

(10) Patent No.: US 7,662,224 B2
(45) Date of Patent: Feb. 16, 2010

(54) HIGH ELONGATION VACUUM FORMABLE DIGITAL INK

(76) Inventor: Donald D. Sloan, 17750 Elm Grove Rd., Platte City, MO (US) 64079

( * ) Notice: Subject to any disclaimer, the term of this patent is extended or adjusted under 35 U.S.C. 154(b) by 452 days.

(21) Appl. No.: 11/557,732

(22) Filed: Nov. 8, 2006

(65) Prior Publication Data

US 2007/0084372 A1    Apr. 19, 2007

Related U.S. Application Data

(63) Continuation-in-part of application No. 11/387,674, filed on Mar. 23, 2006, now Pat. No. 7,427,317, which is a continuation-in-part of application No. 11/346,932, filed on Feb. 3, 2006, now Pat. No. 7,431,759.

(60) Provisional application No. 60/666,926, filed on Mar. 31, 2005.

(51) Int. Cl.
| | | |
|---|---|---|
| C09D 11/00 | (2006.01) | |
| C09D 11/02 | (2006.01) | |
| C09D 11/10 | (2006.01) | |
| C09D 4/00 | (2006.01) | |
| C08F 2/46 | (2006.01) | |
| C08J 3/28 | (2006.01) | |

(52) U.S. Cl. ................ 106/31.6; 106/31.13; 106/31.65; 106/31.85; 106/31.86; 522/71; 522/74; 522/81; 522/150; 522/153; 522/178; 522/182; 522/104; 522/107; 427/374.4; 427/384; 427/385.5; 427/372.2; 427/551; 427/514; 427/511; 427/508

(58) Field of Classification Search ............. 106/31.13, 106/31.6, 31.65, 31.85, 31.86; 522/71, 74, 522/81, 150, 153, 178, 182; 427/508, 511, 427/514, 551, 372.2, 374.4, 384, 385.5
See application file for complete search history.

(56) References Cited

U.S. PATENT DOCUMENTS

| | | | |
|---|---|---|---|
| 4,348,427 A | 9/1982 | Priola et al. | |
| 4,424,314 A | 1/1984 | Barzynski et al. | |
| 4,994,347 A | 2/1991 | Smothers | |
| 5,280,305 A | 1/1994 | Monroe et al. | |
| 5,395,863 A | 3/1995 | Burns et al. | |
| 5,895,624 A | 4/1999 | Reece et al. | |
| 6,023,872 A | 2/2000 | Falkenstein, Sr. | |
| 6,326,419 B1 | 12/2001 | Smith | |
| 6,423,173 B1 | 7/2002 | Wexler | |
| 6,550,905 B1* | 4/2003 | Deckers | 347/100 |
| 6,627,677 B2 | 9/2003 | Smith | |
| 6,796,650 B2 | 9/2004 | Brignone et al. | |
| 2003/0158283 A1 | 8/2003 | Ylitalo et al. | |
| 2003/0202082 A1* | 10/2003 | Takabayashi | 347/105 |
| 2004/0198868 A1 | 10/2004 | Tielemans et al. | |
| 2004/0241578 A1 | 12/2004 | Hirai | |
| 2005/0069682 A1 | 3/2005 | Tseng | |
| 2005/0074681 A1 | 4/2005 | Iwase et al. | |

FOREIGN PATENT DOCUMENTS

| | | |
|---|---|---|
| JP | 01-190712 | 7/1989 |
| JP | 2812580 | 10/1998 |
| JP | 2880845 | 4/1999 |

* cited by examiner

*Primary Examiner*—Sanza L McClendon
(74) *Attorney, Agent, or Firm*—Hovey Williams LLP

(57) ABSTRACT

A curable ink composition for digitally printing onto plastic substrates that can be formed into three-dimensional objects is provided. Generally, the ink composition comprises a pigment, an acrylic polymer or copolymer, a diluent, and a mono-functional monomer.

13 Claims, No Drawings

HIGH ELONGATION VACUUM FORMABLE DIGITAL INK

CROSS-REFERENCE TO RELATED APPLICATIONS

This application is a continuation-in-part of U.S. patent application Ser. No. 11/387,674, filed Mar. 23, 2006 now U.S. Pat. No. 7,427,317, which is a continuation-in-part of U.S. patent application Ser. No. 11/346,932, filed Feb. 3, 2006 now U.S. Pat. No. 7,431,759, both of which claim the benefit of U.S. Provisional Patent Application No. 60/666,926, filed Mar. 31, 2005. All of the foregoing are incorporated by reference herein.

BACKGROUND OF THE INVENTION

1. Field of the Invention

The present invention generally relates to a curable inkjet ink composition for use in digital printing. More specifically, the present invention relates to a curable inkjet ink composition comprising a mono-functional monomer that can be directly printed onto a plastic substrate. The mono-functional monomer enables the ink composition to undergo continuous elongation during thermal processing of the plastic substrate. The present invention further includes methods of forming the curable inkjet ink composition, methods of using the curable inkjet composition, and articles formed using the curable inkjet composition.

2. Description of the Prior

Inkjet imaging techniques have become very popular in commercial and consumer applications. Inkjet printers typically operate by ejecting ink onto a receiving substrate in controlled patterns of closely spaced ink droplets. By selectively regulating the pattern of ink droplets, inkjet printers can produce a wide variety of printed features, including text, graphics, images, holograms, and the like.

Thermal inkjet printers and piezo inkjet printers are the two main types of inkjet systems in widespread use today. For both approaches, inks must meet stringent performance requirements in order for the inks to be appropriately jettable and for the resultant printed features to have the desired mechanical, chemical, visual, and durability characteristics.

Solvent-based and water-based jettable inks are well known. A typical water-based ink generally comprises water, a colorant, which may be a dye and/or a pigment, one or more co-solvents, and one or more additives that are included to enhance the performance of the ink. Representative examples of such additives include one or more colorants, slip modifiers, thixotropic agents, foaming agents, antifoaming agents, flow or other rheology control agents, waxes, oils, plasticizers, binders, antioxidants, fungicides, bactericides, organic and/or inorganic filler particles, leveling agents, opacifiers, antistatic agents, dispersants, and the like.

Solvent-based inks include relatively volatile, organic solvents. Such inks dry more rapidly than aqueous inks. However, such solvents may be toxic, flammable, or the like, requiring careful handling. In addition, the solvent-based inks also tend to be compatible with only a limited range of substrates.

In order to avoid using a conventional solvent, inks incorporating a polymerizable diluent have been developed. The diluent tends to function as a viscosity reducer, as a binder when cured, and optionally as a cross-linking agent. In the uncured state, the inks have a low viscosity and are readily jetted. However, the polymerizable diluents readily cross-link upon exposure to a suitable source of curing energy, for example ultraviolet light, electron beam energy, and/or the like, to form a cross-linked polymer network.

Inkjet inks are typically limited to digitally printing onto flat sheet constructions, such as papers, plastics, banner materials and the like. For plastic substrates or three-dimensional plastic constructions, screen printing was the preferred method since digital printing of inkjet inks onto plastic substrates produced images that cracked or could not elongate under thermal conditions. Therefore, there is a need to be able to digitally print directly onto plastic substrates using inkjet printing systems to form ink images capable of continual elongation during thermal processing.

SUMMARY OF THE INVENTION

The present invention satisfies the above unfulfilled need by providing an ink composition for digitally printing onto plastic substrates which can then be formed into three-dimensional objects. In one embodiment, the present invention is directed toward a digital ink composition comprising an acrylic polymer or copolymer having an average molecular weight of between about 2,500 to about 25,000 g/mole, a mono-functional monomer having a molecular weight of between about 100 to about 600 g/mole, a diluent, and a pigment. It is preferable that the ink compositions be formed without a separately added solvent.

In another embodiment, the present invention is directed toward a method of forming molded, three-dimensional objects containing images digitally printed thereon. The method general comprises providing a flat, unmolded substrate comprising a synthetic resin material, digitally printing the image onto the substrate using an ink prepared in accordance with the present invention, curing the ink composition on the substrate thereby bonding the ink to the substrate, and molding the substrate containing the image into a molded article. During the molding process, the ink elongates thereby preventing the formation of cracks in the image while remaining adhered to the substrate.

In still another embodiment, the present invention is directed toward a molded object having a digitally printed image thereon. The molded object comprises a moldable substrate having an image printed thereon with a digital ink according to the present invention. At least a portion of the substrate is molded to assume a three-dimensional shape without the ink exhibiting any cracking visible to the naked eye.

DETAILED DESCRIPTION OF THE PREFERRED EMBODIMENT

The present invention generally pertains to a curable ink composition for use in digital printing of an ink image directly onto a synthetic resin material or plastic substrate. As used herein, the term "curable" refers to the ability of a material to polymerize, harden, and/or cross-link in response to a chemical additive, or a source of energy such as ultraviolet (UV) energy, light emitting diode (LED) energy, electron beam energy, heat energy, or other source of energy. The ink composition generally comprises an acrylic polymer or copolymer, a mono-functional monomer, a diluent, and a pigment. By "copolymer" it is meant a polymer comprised of different monomeric units.

The acrylic polymer or copolymer preferably presents an acid number of below about 20, and more preferably between about 1 and 20. By "acid number" it is meant the weight in milligrams of potassium hydroxide required to neutralize the pendant carboxylate groups in one gram of polymer. The procedure for determining acid number is described in ASTM D 974 and D 604, incorporated by reference herein. It has been found that the acid number of the acrylic polymer or copolymer may contribute to the stability, functionality and adhesion of the ink composition. Utilizing a low acid number polymer or copolymer is also believed to help maintain and control the viscosity of the system, the wetting of the pigment particles, as well as wetting out of the composition onto the substrate that is being printed.

Preferred acrylic polymers or copolymers for use with the ink compositions of the invention include ethyl methacrylate, methyl methacrylate, butyl methacrylate, or copolymers thereof in any combination. The acrylate polymers and copolymers preferably exhibit a molecular weight from about 2500 g/mole to about 15,000 g/mole and even as high as 25,000 g/mole. Exemplary polymers or copolymers for use with the invention include those obtained from Dianal America, Inc. of Pasadena, Tex., under the designations MB-7022 (acid #0), MB-2588 (acid #15), BR-115 (acid #0), MB-2543 (acid #3), BR-220 (acid #9), MB-2823 (acid #0), and M-2494 (acid #6). Another exemplary acrylic polymer for use in the ink composition of the present invention is a low viscosity aromatic monoacrylate sold under the designation CN 131 by Sartomer Company, Inc, Exton, Pa.

The curable ink composition also includes a mono-functional monomer such as 2-phenoxyethyl acrylate (2-PEA), isobornyl acrylate, ethyl methacrylate, butyl methacrylate, methyl methacrylate or any combination thereof. As used herein, the term "mono-functional monomer" (as opposed to "bi-functional monomer", "di-functional monomer" and/or "multifunctional monomer") refers to a molecule containing one polymerizable functional group per molecule. The mono-functional monomer helps the ink image adhere to the surface of the plastic substrate after printing and curing. The mono-functional monomer has a molecular weight that ranges from about 100 g/mole to about 600 g/mole.

The mono-functional monomer may be supplied in granular or liquid form so long as the selected form allows the mono-functional monomer to be homogeneously dispersed into the curable ink composition during preparation thereof. For example, the mono-functional monomer is in the form of a liquid dispersed with an acrylic polymer when forming an ink composition that is cured using UV and LED energy. Additionally, the mono-functional monomer may be supplied simply as an individual mono-functional monomer, or supplied in various prepared mixtures of two or more mono-functional monomers.

When the curable ink composition cures from a liquid state to a solid state, the mono-functional monomer enables the curable ink composition to form (1) a chemical bond, (2) a mechanical bond, or (3) a combination of chemical and mechanical bonds with the plastic substrate. As a result, the ink image can undergo elongation of about 100% to about 900% during molding of the plastic substrate into a three-dimensional object. Preferably, the ink image can undergo elongation of between about 300 to about 900%, and more preferably between about 400 to about 900%. The degree of elongation of which the present ink is capable generally exceeds the degree of elongation of the substrate onto which it is printed, Thus, the substrate onto which the image is printed will generally undergo shear or tensile failure before the ink image will crack, separate, or otherwise fail. Thus, the ink image does not crack, have voids, vaults, separations, or undergo other types of distortion that are discernable to the naked eye during molding of the substrate.

Though descriptions of the present invention are primarily made in terms of the preferred mono-functional monomer that includes at least one mono-functional acrylate, it is to be understood that other mono-functional monomers may be substituted in place of the mono-functional acrylate(s) in accordance with the present invention, while still realizing benefits of the present invention. Likewise, it is to be understood that any combination of a mono-functional acrylate and another mono-functional monomer may be used in accordance with the present invention, while still realizing the benefits of the present invention.

The amount of mono-functional monomer used in accordance with the present invention is sufficient to effect the forming of (1) a chemical bond, (2) a mechanical bond, or (3) a combination of chemical and mechanical bonds between the curable ink composition and the plastic substrate. The amount of the mono-functional monomer may vary, depending upon the molecular weight of the oligomer, the pigment, the mixing conditions, any additives, and the desired flow, viscosity, wetting ability, compatibility, and curing rate of the curable ink composition. The amount of mono-functional monomer may also vary based upon the desired durability, flexibility, elasticity, gloss, hardness, chemical resistance, stiffness, and/or desired elongation characteristics of the curable ink composition. The concentration of the mono-functional monomer ranges from about 10 to about 96 weight percent, based on the total weight of the curable ink composition. More preferably, the mono-functional monomer level is between about 15 to about 85 percent by weight of the curable ink composition.

The pigment used to practice the present invention may be supplied in granular or liquid form. The pigment may also be supplied as a dispersion. As used herein, the term "pigment" refers to an insoluble colorant or solid colorant particles that remain suspended or dispersed when introduced into a carrier fluid. Furthermore, it is to be understood that the term "pigment" is not meant to encompass a dye or water-soluble colorant containing particles that are fully dissolvent in the carrier fluid.

The pigment preferably presents particle sizes ranging from about 0.5 to about 1.5 microns and may be added to the curable ink composition in a dispersed form. The dispersion may include a pigment, a monomer and a dispersant in which the pigment is dispersed. Occasionally, an oligomeric material may also be included in the dispersion to hold the pigment in suspension. Furthermore, the pigment may be supplied as individual pigments, or supplied in various solid levels, that are pre-dispersed in mono-functional acrylate systems. Of course, the pigment solutions may be supplied in a variety of pigment colors.

The amount of pigment used in accordance with the present invention is effective to (1) maximize the curing rate of the curable ink composition, (2) impart the desired color to the curable ink composition and final printed ink image, (3) obtain the desired wetting ability, and/or (4) enhance receptivity to UV or LED energy. The amount of pigment may vary depending upon the type of mono-functional monomer; the polymer or oligomer, the mixing conditions, the use of any additives, and the desired flow, viscosity, adhesion of the cured ink composition to the plastic substrate, the desired durability, flexibility, elasticity, gloss, hardness, chemical resistance, stiffness, desired elongation characteristics, and any combination thereof. When the pigment is white, the concentration typically ranges from about 0 to about 40 weight percent based on the total weight of the curable ink composition. When the pigment is any other color, the pigment concentration typically ranges from about 10 to about 15 weight percent based on the total weight of the curable ink composition.

Exemplary pigments for use with the present invention include Elftex 12 (carbon black) available from Cabot Corporation, Blue NGA (pigment blue) and Cromophtal Yellow 3G (pigment yellow 93) available form Ciba-Geigy, Rhodamine YS (pigment red 81) and Quinacridone Magenta (pigment red 122) available from Sun Chemical, and any combination thereof.

The curable ink composition further includes a diluent that is used to modify the viscosity of the curable ink composition. The diluent generally comprises one or more monomers. The monomer may be mono-functional or comprise two or more functional polymerizable groups per molecule. The monomers of the diluent preferably present molecular weights of less than about 1500 g/mole, and more preferably between about 500 to about 1500 g/mole. Exemplary diluents include vinylpyrrolidone, N-vinylcaprolactam, and CD-420 acrylic monomer available from Sartomer Company, Inc. of Exton, Pa. In certain embodiments, however, it is preferred that the diluent does not comprise or include N-vinylcaprolactam. The diluent is preferably present at a level of from about 5 to about 25 weight percent based on the weight of the entire ink composition.

The curable ink composition may also include an oligomer that is effective to (1) control viscosity, (2) reduce shrinkage, (3) enhance durability, (4) enhance flexibility, (5) control adhesion of the cured ink composition, and/or (6) control wetting ability. As used herein, the term "oligomer" refers to two or more reacted monomers that have a collective molecular weight of more than about 10,000 g/mole. Furthermore, it is to be understood that the term "oligomer" refers to both reacted monomeric chains that are capable of further reaction and polymers that are considered to have no further substantial reactivity.

It is preferable that the oligomer generally includes two or more monomers having one or more functional polymerizable groups. Exemplary oligomers for use with the present invention include polyurethane, acrylic materials, polyesters, polyimides, polyamides, epoxies, polystyrene, styrene and substituted styrene-containing materials, fluorinated materials, and combinations thereof.

The curable ink compositions also preferably includes a photo-initiator additive. As used herein, the term "photo-initiator" refers to a compound that absorbs light energy and is responsible for the production of free radicals in a free radical polymerization system. In general, the type and amount of photo-initiator that is used with the present invention may vary depending upon the radiation or energy source, the curable ink composition thickness, the pigment, the thermal elongation factor, the diluent, the oligomer, and the desired curing rate. UV curable photo-initiators generally cure between the spectral output range of about 260 to about 320 nanometers. The LED curable photo-initiators generally cure between the spectral output range of about 250 to about 410 nanometers.

Typically, the curable ink composition includes from about 1 to about 8 percent by weight of the photo-initiator, based on the total weight of the curable ink composition. Preferably, the ink composition comprises from about 1 to about 3 percent by weight of the photo-initiator.

Exemplary photo-initiators suitable for use with the present invention include ITX (2-isopropylthiaoxantlone), Irgacure® 184 (1-benzoyl-1-hydroxycyclohexanie), TPO (2,4,6-trimethylbenzoylphenylphosphineoxide), benzoin ethers such as benzoin isopropyl ether, benzyl dimethyl ketal (commercially available as Irgacure® 651 from Ciba-Geigy), 2-methyl-1-[4-(methylthio)phenyl]-2-(4-morpholinyl)-1-propanone (Irgacure® 907), 2-benzyl-2-(dimethylamino)-1-[4-(4-morpholinyl)phenyl]-1-butanone (Irgacure® 369), mono- and bis-acylphosphines such as Irgacure® 1700, Irgacure® 1800, Irgacure® 1850, Irgacure® 184, Darocur® 4265, and Darocure® 1173.

The curable ink composition may further include one or more optional additives. These optional additives can comprise one or more solvents, anti-foaming agents, flow or other rheology control agents, oils, plasticizers, binders, antioxidants, photo-initiator stabilizers, fungicides, bactericides, organic and/or inorganic filler particles, leveling agents, opacifiers, antistatic agents, dispersants, or combination thereof.

As noted above, in certain preferred embodiments, the curable ink composition does not include a separately added solvent. By "separately added", it is meant a material that is separate from an explicitly recited component of the ink composition and added to the formulation by itself and not as a mixture of other non-solvent components. Even though an explicitly recited component may exhibit the ability to dissolve or partially dissolve one or more of the other recited components, it is not a "separately added solvent" for purposes herein. The present invention does not require a solvent for the purposes of reducing the overall surface tension of the composition, reducing the viscosity of the composition, or promoting the desired level of wetting or adhesion of the ink to the substrate. Thus, the present invention has eliminated the need for and, in certain embodiments, does not in fact include a solvent such as those described in U.S. Pat. No. 6,558,753, incorporated by reference herein. In particularly preferred embodiments, the ink composition comprises less than about 0.05% by weight of a separately added solvent, more preferably less than about 0.001% by weight, and most preferably is entirely free of a separately added solvent.

Preferred ink formulations do not include any separately added water; alcohols such as isopropyl alcohol or ethanol; ketones such as methyl ethyl ketone, cyclohexanone, or acetone; aromatic hydrocarbons; isophorone; butyrolactone; N-methyl pyrrolidone; tetrahydrofuran, ethers such as lactates, acetates, and the like; ester solvents such as propylene glycol monomethyl ether acetate (PM acetate), diethylene glycol ether acetate (DE acetate), ethylene glycol butyl ether acetate (EB acetate), dipropylene glycol monomethyl acetate (DPM acetate, iso-alkyl esters, isohexyl acetate, isoheptyl acetate, isooctyl acetate, isononyl acetate, isodecyl acetate, isododecyl acetate, isotridecyl acetate or other iso-alkyl esters; and combinations of these and the like.

The ink composition preferably exhibits a high degree of stability. By "stability" it is meant that the ink and/or pigment are kept in suspension with no settling or separation of the remainder of the composition. Ink images printed with the ink composition of the present invention also exhibit excellent exterior durability.

The curable ink compositions can be prepared by homogeneously mixing the mono-functional monomers and diluent. Next the acrylic polymer is added while mixing to form a more viscous intermediate. Any optional additives are subsequently blended into the viscous intermediate to form an uncolored curable intermediate, often referred to as a varnish. Finally, the pigment is added to form the curable ink composition. If the curable ink composition is to be cured using UV energy or LED energy, then the photo-initiator is added when the additives are blended into the mixture.

The curable ink compositions typically present viscosities ranging from about 12 to about 60 centipoise at 25° C., more preferably between about 12 to about 30 centipoise at 25° C. The low ink viscosities permit the ink to be jetted through small diameter piezoelectric inkjet heads having nozzle diameters of between about 20 to about 60 microns. The inks can be used in conjunction with heated inkjet heads which serve to lower the viscosity even further. The heated inkjet heads can heat the ink to temperatures of between about 25° C. to about 90° C., however, preferably, the ink will be heated to between about 30° C. to about 50° C. Upon heating, the viscosity of the ink is reduced, preferably to a level of about 8 to about 22 centipoise at 40° C. Another advantage of low viscosity is that smaller ink drop sizes are possible than with other kinds of inks. Preferably, the drop size of the inks of the present invention are between about 30 to about 140 picoliters, more preferably between about 30 to about 80 picoliters.

The curable ink composition may be applied or printed to the surface of any synthetic resin material including those substrates comprising acrylonitrile butadiene styrene (ABS), styrenes, polystyrenes, cast acrylics, extruded acrylics, polycarbonates, polyethylenes, polypropylenes, polyesters, co-extruded polyesters, glycolized polyester (PETG), amorphous polyethylene terephthalate (APET), rigid vinyls, polyvinyl chlorides, or any combination thereof. It is particularly preferred that the substrate be rigid at 25° C., or at least have a glass transition temperature of at least 25° C. By "rigid", it is meant that the substrate is relatively inelastic and/or inflexible at the stated temperature. Preferably, the substrate must be heated to a temperature above its glass transition point in order for it to be bent, flexed, or shaped. Thus, preferred substrates are generally inflexible at 25° C. Although, it is within the scope of the present invention for the substrate to be a relatively elastic material such as a rubber or rubber-like material, or yieldable film.

Generally, the curable ink composition is digitally printed onto the surface of the plastic substrate using an inkjet printer that contains a reservoir of the curable ink composition. Digital UV printing generally occurs by printing the ink composition through at least one inkjet head having a temperature of between about 120° F. to about 160° F. and firing through nozzles having opening between about 27 to about 52 microns in size. However, other application techniques are also acceptable for applying the curable ink composition to the plastic substrate, such as ink jetting, screen printing, spraying, gravure coating, knife coating, brushing, curtain coating, flexography, and the like.

During printing, the curable ink composition is deposited or printed onto a surface of a substrate. After printing, the ink is cured by exposing the printed surface to UV or LED energy. The process of curing is effective to form (1) a chemical bond, (2) a mechanical bond, or (3) any combination of a chemical or mechanical bond between the ink composition and the plastic substrate. Furthermore, the mono-functional monomer aids the formation of a bond between the ink composition and the plastic substrate and may be characterized as adhering the ink composition to the plastic substrate.

The amount of curing energy to be used for curing depends upon a number of factors, such as the amount and the type of reactants involved, the energy source, the web speed (if cured on a web), the distance from the energy source, and the thickness of the material to be cured. Generally, the rate of curing tends to increase with increased energy intensity. The rate of curing also may tend to increase with increasing amounts of catalyst and/or initiator present in the curable composition.

In general, UV or LED energy is used to cure the curable ink composition when practicing the present invention. Exposure tines may be from less than about 1 second up to about 10 minutes or more. Radiation exposure may occur in air or in an inert atmosphere, such as nitrogen.

As noted above, curing and properly drying the curable inkjet ink composition forms an ink image on the plastic substrate that elongates to a range that is 100% to 900% of the original ink size. Once the curable inkjet ink composition is cured, the ink image is characterized as being thermoplastic since the ink image and the plastic substrate are bonded to each other. Furthermore, the combination of the cured ink image and the plastic substrate allows thermal heating of the plastic substrate above its glass transition temperature, thereby permitting the substrate to be thermally processed. By "thermally processed", it is meant that the substrate can be vacuum formed, heat bent, heat folded, or processed using any such thermal technique known in the art. The substrate can be fabricated or formed using vacuum-forming equipment, heat-bending equipment, heat-folding equipment or any other equipment that allows for forming a plastic substrate into a three-dimensional object. Preferably, the thermal processing of the substrate occurs at a temperature of at least about 50° C., and more preferably between about 70° C. to about 200° C. Thus, the inks according to the present invention are capable of withstanding relatively high temperatures without degrading or being heat damaged.

During the thermal forming process, the ink image continuously elongates or stretches at the same rate as the plastic material to create a three-dimensional product with digitally printed graphics. Furthermore, the printed ink image maintains the uniformity of the ink characteristics by not undergoing cracking, void formation, or separation even when the plastic substrate undergoes thermal processing.

The curable ink compositions are also particularly well suited to be used to digitally print fleet marks for commercial vehicles such as trucks and trailers. The surfaces of the vehicles to which the fleet mark is to be applied are generally not entirely flat or planar. For example, the side of a semi-trailer generally comprises rivets or bolts that protrude through the outer skin of the trailer. In order for the fleet mark to be applied and provide a sleek, form-fitting appearance, the vinyl must be stretched over or shrunk down around these rivets or bolts. Consequently, as the vinyl stretches and deforms, so too must the ink from which the fleet mark image is made, otherwise, the mark's image will exhibit unsightly cracking, void formation, or separation.

The fleet marks are prepared by printing the mark, using an ink prepared in accordance with the present invention, onto a web comprising a synthetic resin material (preferably vinyl) having a pressure sensitive adhesive on the backside thereof. The adhesive side of the web usually has a backing sheet material applied thereto in order to protect the adhesive until the mark is ready to be applied. However, it is within the scope of the present invention to employ a web not comprising an adhesive which self-adheres to the vehicle surface, particularly when heat is applied. The fleet mark is then applied to the vehicle's surface and heat guns are used to shrink the vinyl down over any features that may be protruding above the surface. As the vinyl conforms to the irregular features, the ink elongates to stretch over those features while maintaining the integrity of the image.

Commercially available digital printing inkjet inks do exhibit thermal elongation properties. Prior to development of the curable inkjet ink compositions according to the present invention, three-dimensional plastic products having images printed thereon were made using screen printing techniques as screen printing inks were the only commercially available inks having continuous thermal elongation properties.

The curable ink compositions of the present invention, after printing and curing, exhibit thermal elongation characteristics. As a result, curable ink compositions having thermal elongation properties are believed capable of creating a new market for the digital printing industry since digitally printed constructions derived from plastic substrates can now be vacuum formed, heat-bent, and/or heat-folded.

Therefore, use of the curable inkjet ink composition of the present invention enables (1) use of digital printing equipment to produce digitally printed plastic items, (2) cost reduction when producing prototypes or smaller volume runs, (3) withstanding total water immersion, and/or (4) digital inkjet print production of three-dimensional plastic objects that is more cost effective than conventional techniques. In addition, digital printing is known to offer enhanced definition and resolution of graphics when compared to screen printing. Therefore, digital printing onto plastic substrates is now possible with the curable ink composition of the present invention.

EXAMPLES

The following examples set forth preferred ink formulations made in accordance with the present invention. It is to be understood, however, that these examples are provided by way of illustration and nothing therein should be taken as a limitation upon the overall scope of the invention.

Example 1

In this Example, a UV curable ink having the following formulation was made:

| | |
|---|---|
| 20.50% | IBOA (isobornyl acrylate) |
| 23.50% | 2-PEA (2-phenoxyethyl acrylate) |
| 26.00% | V-Pyrol (vinyl pyrrolidone) |
| 30.00% | Dianal Acrylic Polymer #7165 |
| 3.00% | DBE (dibasic ester) |

Approximately 17.50% of isobornyl acrylate (SR506 from Sartomer Company of France) was mixed with approximately 23.50% of 2-PEA and 26.00% of V-Pyrol (from ISP Chemicals of Wayne, N.J.). This mixture was continuously stirred while adding 30.00% of Dianal acrylic polymer #7165 from Dianal America, Inc. of Pasadena, Tex. Next 3.00% of DBE (dibasic ester) was added to the mixture to form an uncolored varnish. Next, pigment was added to the uncolored varnish to form the curable ink composition. The pigment included particle sizes that range from 0.5 to 1.5 microns.

The resulting ink was able to successfully print through digital printing equipment having nozzles with openings between 27 and 52 microns in size.

Example 2

In this Example, a UV curable ink having the following formulation was made:

| | |
|---|---|
| 17.50% | IBOA (isobornyl acrylate) |
| 23.50% | 2-PEA (2-phenoxyethyl acrylate) |
| 26.00% | V-Pyrol (vinyl pyrrolidone) |
| 30.00% | Dianal Acrylic Polymer #TB-0017 |
| 3.00% | DBE (dibasic ester) |

Approximately 17.50% of the isobornyl acrylate (SR506) was mixed with approximately 23.50% of 2-PEA and 26.00% of V-Pyrol. This mixture was stirred while adding 30.00% of Dianal acrylic polymer #TB-0017. Next, 3.00% of DBE (dibasic ester) was added to the mixture to form an uncolored varnish. Next, pigment was added to the uncolored varnish to form the curable ink composition. The pigment included particle sizes that ranged from 0.5 to 1.5 microns.

The resulting ink was able to successfully print through digital printing equipment having nozzles with openings between 27 and 52 microns in size.

Example 3

In this Example, a UV curable ink having the following formulation was made:

| | |
|---|---|
| 17.50% | IBOA (isobornyl acrylate) |
| 23.50% | 2-PEA (2-phenoxyethyl acrylate) |
| 26.00% | V-Pyrol (vinyl pyrrolidone) |
| 30.00% | Dianal Acrylic Polymer #7165 |
| 3.00% | DBE (dibasic ester) |

Approximately 17.50% of isobornyl acrylate (SR506) was mixed with approximately 23.50% of 2-PEA and 26.00% of V-Pyrol. This mixture was continuously stirred while adding 30.00% of Dianal acrylic polymer #7165. Next, 3.00% of DBE (dibasic ester) was added to the mixture to form an uncolored varnish. Next, pigment was added to the uncolored varnish to form the curable ink composition. The pigment included particle sizes that ranged from 0.5 to 1.5 microns.

The resulting ink was able to successfully print through digital printing equipment having nozzles with openings between 27 and 52 microns in size.

Example 4

In this Example, a solvent based ink having the following formulation was made:

| | |
|---|---|
| 39.70% | EEP Solvent (ethyl 3, ethoxy propionate) |
| 17.00% | Cyclohexanone |
| 26.00% | Diacetone alcohol |
| 0.50% | G-60 plasticizer |
| 4.00% | Butyrate CAB-551-02 |
| 26.00% | Dianal Acrylic Polymer #TB-0017 |

Approximately 39.70 of EEP solvent (ethyl 3, ethoxy propionate), 17.00% cyclohexanone, 26.00% diacetone alcohol, 0.50% G-60 plasticizer (CP Hall Company of Chicago, Ill.) were mixed together. This mixture was continuously stirred while adding 4.00% cellulose acetate butyrate CAB-551-02 (from Eastman Chemical Company of Kingsport, Tenn.) and 26.00% of Dianal acrylic polymer #TB-0017 to form an uncolored varnish. Next, pigment was added to the uncolored varnish to form the curable ink composition. The pigment included particle sizes that ranged from 0.5 to 1.5 microns.

The resulting ink was able to successfully print through digital printing equipment having nozzles with openings between 27 and 52 microns in size.

Example 5

In this Example, a solvent based ink having the following formulation was made:

| | |
|---|---|
| 39.70% | EEP Solvent (ethyl 3, ethoxy propionate) |
| 17.00% | Cyclohexanone |
| 26.00% | Diacetone alcohol |
| 0.50% | G-60 plasticizer |
| 4.00% | Butyrate CAB-551-02 |
| 26.00% | Dianal Acrylic Polymer #7165 |

Approximately 39.70 of EEP solvent (ethyl 3, ethoxy propionate), 17.00% cyclohexanone, 26.00% diacetone alcohol, 0.50% G-60 plasticizer (CP Hall Company of Chicago, Ill.) were mixed together. This mixture was continuously stirred while adding 4.00% cellulose acetate butyrate CAB-551-02 (from Eastman Chemical Company of Kingsport, Tenn.) and 26.00% of Dianal acrylic polymer #7165 to form an uncolored varnish. Next, pigment was added to the uncolored varnish to form the curable ink composition. The pigment included particle sizes that ranged from 0.5 to 1.5 microns.

The resulting ink was able to successfully print through digital printing equipment having nozzles with openings between 27 and 52 microns in size.

Example 6

In this Example, a UV curable ink having the following formulation was made:

| | |
|---|---|
| 10.00% | Dibasic Ester/Solvent |
| 29.30% | M-8200/2-Phenoxyethyl Acrylate[1] |
| 18.00% | M-8130/Isobornyl Acrylate[1] |
| 1.30% | Firstcure ® ST-I Polymerization Inhibitor[2] |
| 13.00% | CPR-9000 Styrene Acrylate copolymer[3] |
| 4.00% | ESA Cure KTO-46 Photoinitiator[1] |
| 14.00% | Photoinitiator Solution[4] |
| 9.00% | Blue Pigment Dispersion |
| 0.80% | Cognis 3250 Additive[5] |
| 0.60% | Tego ® 2250 Additive[6] |

[1]From Sartomer Company, Inc. of Exton, Pennsylvania
[2]From Albemarle Corporation of Baton Rouge, Louisiana
[3]From Eliokem of France
[4]Photoinitiator Solution is made by mixing 38 parts of Darocur ® 1173 from Ciba Specialty Chemicals Corporation of Basil, Switzerland, with 13 lbs. of Irgacure ® and 17 lbs. of Irgacure ® 184 (both from Ciba Specialty Chemicals) along with 14 parts of Firstcure ® EDAB and 17 parts of Firstcure ® ITX (both from Albemarle Corporation of Baton Rouge, Louisiana). The mixture is heated to 240° F. or until all the initiators have dissolved.
[5]From Cognis of Germany.
[6]From Degussa, AG of Essen, Germany.

Approximately 18.00% of isobornyl acrylate (SR506), 29.00% 2-phenoxyethyl acrylate and 10% dibasic ester solvent were mixed together. The temperature during mixing did not exceed approximately 150° F. While the mixture was still being agitated, approximately 13% of CPR-9000 styrene acrylate copolymer was mixed until the copolymer was dissolved. After the copolymer was dissolved, approximately 9% of a blue UV dispersion was added into the mixture for colorant. A photoinitiator solution was added to form a curable ink composition. Additives such as Cognis 3250 were added to provide pigment stability. Tego® 2250 was added to enable the ink to wet out on its substrate and give the surface of the ink mar resistance.

Example 7

In this example, a UV curable ink formulation was made using an acrylic solution and an initiator solution prepared as follows:

Acrylic Solution

| | |
|---|---|
| 43.50% | M-8200/2-Phenoxyethyl Acrylate[1] |
| 37.50% | M-2000 Vinylcaprolactam[2] |
| 1.50% | Z-4500 ST-I Firstcure ® polymerization inhibitor (stabilizer)[3] |
| 17.50% | MB-2594 Acrylic Resin[8] |

Approximately 43.50% of 2-phenoxyethylacrylate, 37.50% of vinylcaprolactam, and 1.50% of stabilizer were mixed together. While mixing, MB-2594 Acrylic Resin was added at a temperature not exceeding 130° F.

Initiator Solution

| | |
|---|---|
| 62.70% | IBOA (isobornyl acrylate)[1] |
| 0.70% | Z-4500 ST-I Firstcure ® polymerization inhibitor (stabilizer)[3] |
| 8.60% | ITX (Isopropylthioxanthone)[4] |
| 6.00% | Irgacure ® 369 (Aminoketone)[5] |
| 10.00% | Irgacure ® 184 (Hydroxyketone)[5] |
| 12.00% | Ethyl-4 (Dimethylamino) benzoate[4] |

The photoinitiator solution was made by initially mixing 62.70% isobornylacrylate, and 0.70% Firstcure® ST-I polymerization inhibitor. While mixing these components, 8.60% of isopropylthioxanthone, 6% Irgacure® 369, 10.00% Irgacure® 184, and 12.00% ethyl-4(dimethylanino)benzoate were added. The mixture was mixed until dissolved.

The ink formulation comprised the following:

| | |
|---|---|
| 39.83% | Acrylic Solution |
| 30.37% | Initiator Solution |
| 10.00% | Vinylcaprolactam[2] |
| 18.00% | Blue Dispersion[7] |
| 0.80% | Z-4500 ST-I Firstcure ® polymerization inhibitor (stabilizer)[3] |
| 1.00% | Ebercryl 381 additive[6] |

[1]From Sartomer Company, Inc. of Exton, Pennsylvania
[2]From Base Corporation of Mount Olive, New Jersey
[3]From Eliokem of France
[4]From Albemarle Corporation of Baton Rouge, Louisiana
[5]From Ciba Specialty Chemicals Corporation of Basil, Switzerland.
[6]From Cytec Industries Inc. of West Paterson, New Jersey.
[7]From RJA Dispersions.
[8]From Dianal America, Inc. of Pasadena, Texas The acrylic solution and the initiator solution were mixed together along with 10.00% vinylcaprolactam, 18.00% blue dispersion, 0.80% stabilizer and 1.00% Ebecryl 381. The amount of acrylic solution and initiator solution may be varied depending upon the amount of blue dispersion used. The blue dispersion may be varied depending upon the color intensity desired in the formulation. The initiator solution may be varied depending upon the amount of cure desired,

Example 8

In this example, a UV curable ink formulation was made using an acrylic solution and an initiator solution prepared as follows:

Acrylic Solution

| | |
|---|---|
| 43.50% | M-8200/2-Phenoxyethyl Acrylate[1] |
| 37.50% | M-2000 Vinylcaprolactam[2] |
| 1.50% | Z-4500 ST-I Firstcure ® polymerization inhibitor (stabilizer)[3] |
| 17.50% | MB-2823 Acrylic Resin[8] (Acid #0) |

Approximately 43.50% of 2-phenoxyethylacrylate, 37.50% of vinylcaprolactam, and 1.50% of stabilizer were mixed together. While mixing, MB-2823 Acrylic Resin was added at a temperature not exceeding 130° F.

Initiator Solution

| | |
|---|---|
| 62.70% | IBOA (isobornylacrylate)[1] |
| 0.70% | Z-4500 ST-I Firstcure ® polymerization inhibitor (stabilizer)[3] |
| 8.60% | ITX (Isopropylthioxanthone)[4] |
| 6.00% | Irgacure ® 369 (Aminoketone)[5] |
| 10.00% | Benzyldimethylketal[5] |
| 12.00% | Ethyl-4 (Dimethylamino) benzoate[4] |

The photoinitiator solution was made by initially mixing 62.70% isobornylacrylate, and 0.70% Firstcure® ST-I polymerization inhibitor. While mixing these components, 8.60% of isopropylthioxanthone, 6% Irgacture® 369, 10.00% benzyldimethylketal, and 12.00% ethyl-4(dimethylamino)benzoate were added. The mixture was mixed until dissolved.

The ink formulation comprised the following:

| | |
|---|---|
| 40.00% | Acrylic Solution |
| 35.00% | Initiator Solution |
| 10.00% | CN-131 Low Viscosity Aromatic Monoacrylate Oligomer[1] |
| 14.00% | D3010K Black Dispersion[7] |
| 1.00% | Ebercryl 381 additive[6] |

[1]From Sartomer Company, Inc. of Exton, Pennsylvania
[2]From Base Corporation of Mount Olive, New Jersey
[3]From Eliokem of France
[4]From Albemarle Corporation of Baton Rouge, Louisiana
[5]From Ciba Specialty Chemicals Corporation of Basil, Switzerland.
[6]From Cytec Industries Inc. of West Paterson, New Jersey.
[7]From RJA Dispersions.
[8]From Dianal America, Inc. of Pasadena, Texas The acrylic solution and the initiator solution were mixed together along with 10.00% CN-131, 14.00% black dispersion, and 1.00% Ebecryl 381.

Example 9

In this example, a UV curable ink formulation was made using an acrylic solution and an initiator solution prepared as follows:

Acrylic Solution

| | |
|---|---|
| 42.00% | M-8200/2-Phenoxyethyl Acrylate[1] |
| 37.00% | M-2000 Vinylcaprolactam[2] |
| 1.00% | Z-4500 ST-I Firstcure ® polymerization inhibitor (stabilizer)[3] |
| 20.00% | MB-2594 Dianal Acrylic Resin[8] (Acid #6) |

Approximately 42.00% of 2-phenoxyethylacrylate, 37.00% of vinylcaprolactam, and 1.00% of stabilizer were mixed together. While mixing, the MB-2594 acrylic resin was added at a temperature not exceeding 130° F.

Initiator Solution

| | |
|---|---|
| 62.70% | IBOA (isobornylacrylate)[1] |
| 0.70% | Z-4500 ST-I Firstcure ® polymerization inhibitor (stabilizer)[3] |
| 8.60% | ITX (Isopropylthioxanthone)[4] |
| 6.00% | Irgacure ® 369 (Aminoketone)[5] |
| 10.00% | Benzyldimethylketal[5] |
| 12.00% | Ethyl-4 (Dimethylamino) benzoate[4] |

The photoinitiator was made according to the procedure of Example 8.

The ink formulation comprised the following:

| | |
|---|---|
| 40.00% | Acrylic Solution |
| 35.00% | Initiator Solution |
| 10.00% | CN-131 Low Viscosity Aromatic Monoacrylate Oligomer[1] |
| 14.00% | D3010K Black Dispersion[7] |
| 1.00% | Ebercryl 381 additive[6] |

[1]From Sartomer Company, Inc. of Exton, Pennsylvania
[2]From Base Corporation of Mount Olive, New Jersey
[3]From Eliokem of France
[4]From Albemarle Corporation of Baton Rouge, Louisiana
[5]From Ciba Specialty Chemicals Corporation of Basil, Switzerland.
[6]From Cytec Industries Inc. of West Paterson, New Jersey.
[7]From RJA Dispersions.
[8]From Dianal America, Inc. of Pasadena, Texas The acrylic solution and the initiator solution were mixed together along with 10.00% CN-131, 14.00% black dispersion, and 1.00% Ebecryl 381.

Example 10

In this example, a UV curable ink formulation was made using an acrylic solution and an initiator solution prepared as follows:

Acrylic Solution

| | |
|---|---|
| 41.50% | M-8200/2-Phenoxyethyl Acrylate[1] |
| 37.00% | M-2000 Vinylcaprolactam[9] |
| 1.50% | Genorad 16 (stabilizer)[2] |
| 20.00% | MB-2823 Acrylic Resin[8] (Acid #0) |

Approximately 41.50% of 2-phenoxyethylacrylate, 37.00% of vinylcaprolactam, and 1.50% of stabilizer were mixed together. While mixing, MB-2823 Acrylic Resin was added at a temperature not exceeding 130° F.

Initiator Solution

| | |
|---|---|
| 62.70% | IBOA (isobornylacrylate)[1] |
| 0.70% | Z-4500 ST-I Firstcure ® polymerization inhibitor (stabilizer)[3] |
| 8.60% | ITX (Isopropylthioxanthone)[4] |
| 6.00% | Irgacure ® 369 (Aminoketone)[5] |
| 10.00% | Benzyldimethylketal[5] |
| 12.00% | Ethyl-4 (Dimethylamino) benzoate[4] |

The photoinitiator was made according to the procedure of Example 8.

The ink formulation comprised the following:

| | |
|---|---|
| 40.00% | Acrylic Solution |
| 35.00% | Initiator Solution |
| 10.00% | CN-131 Low Viscosity Aromatic Monoacrylate Oligomer[1] |
| 14.00% | D3010K Black Dispersion[7] |
| 1.00% | Ebercryl 381 additive[6] |

[1]From Sartomer Company, Inc. of Exton, Pennsylvania
[2]From Rajm A.G. Switzerland
[3]From Eliokem of France
[4]From Albemarle Corporation of Baton Rouge, Louisiana
[5]From Ciba Specialty Chemicals Corporation of Basil, Switzerland.
[6]From Cytec Industries Inc. of West Paterson, New Jersey.
[7]From RJA Dispersions.
[8]From Dianal America, Inc. of Pasadena, Texas
[9]From ISP Chemicals Inc. of Wayne, New Jersey The acrylic solution and the initiator solution were mixed together along with 10.00% CN-131, 14.00% black dispersion, and 1.00% Ebecryl 381.

Example 11

This example describes the formulation of UV curable inks using an acrylic solution and an initiator solution prepared as follows:

Acrylic Solution

| | |
|---|---|
| 15.00% | Isobornyl acrylate[1] |
| 63.70% | CD-420 acrylic monomer[1] |
| 1.3% | ST-I Firstcure ® polymerization inhibitor (stabilizer)[3] |
| 20.00% | MB-2594 Acrylic Resin[8] |

Approximately 15.00% of isobornyl acrylate, 63.70% of CD-420 acrylic monomer, and 1.30% of stabilizer were mixed together. While mixing, the MB-2594 acrylic resin was added at a temperature not exceeding 130° F.

Initiator Solution

| | |
|---|---|
| 31.35% | IBOA (isobornylacrylate)[1] |
| 31.35% | CD-420 Acrylic monomer[1] |
| 0.70% | ST-I Firstcure ® polymerization inhibitor (stabilizer)[3] |
| 8.60% | DETX (2,4 Diethylthioxanthone)[4] |
| 6.00% | Irgacure ® 369 (Aminoketone)[5] |
| 10.00% | Irgacure ® 184 (Hydroxyketone)[5] |
| 12.00% | Ethyl-4 (Dimethylamino) benzoate[4] |

The IBA, acrylic monomer, and stabilizer were added together and mixed. While mixing, the DETX, Irgacure® 369, Irgacure® 184, and ethyl-4(dimethylamino)benzoate were added.

Inks comprising the acrylic solution and an initiator solution may be formulated as follows:

| | |
|---|---|
| 15-25% | Acrylic Solution |
| 35% | Initiator Solution |
| 10-20% | CD-420 Acrylic monomer[1] |
| 10-20% | Pigment dispersion[7] |
| 0.60% | Tego ® Glide 450 (Polyether-modified polysiloxane)[6] |
| 10-20% | Isobornyl acrylate[1] |
| 2% | Irgacure ® 819 (bis acyl phosphine)[5] |

[1]From Sartomer Company, Inc. of Exton, Pennsylvania
[2]From Rajm A.G., Switzerland
[3]From Eliokem of France
[4]From Albemarle Corporation of Baton Rouge, Louisiana
[5]From Ciba Specialty Chemicals Corporation of Basil, Switzerland.
[6]From Cytec Industries Inc. of West Paterson, New Jersey.
[7]From RJA Dispersions.
[8]From Dianal America, Inc. of Pasadena, Texas
[9]From ISP Chemicals Inc. of Wayne, New Jersey The acrylic solution and the initiator solution were mixed together along with 10.00% CN-131, 14.00% black dispersion, and 1.00% Ebecryl 381.

Although the present invention has been described with reference to preferred embodiments, workers skilled in the art will recognize that changes may be made in form and detail without departing from the spirit and scope of the invention.

I claim:

1. A digital ink composition for inkjet printing of an image onto a substrate comprising an acrylic polymer or copolymer having an average molecular weight of between about 2,500 to about 25,000 g/mole, a mono-functional monomer having a molecular weight of between about 100 to about 600 g/mole, a diluent, and a pigment, said ink being without a separately added solvent, wherein the ink composition when cured is capable of continuous elongation by 100% to 900% during molding of the substrate which results in stretching of the substrate.

2. The composition according to claim 1, said mono-functional monomer being selected from the group consisting of methyl methacrylate, ethyl methacrylate, butyl methacrylate, 2-phenoxyethyl acrylate, isobornyl acrylate, and combinations thereof 3. The composition according to claim 1, said acrylic polymer or copolymer having an acid number of less than about 20.

4. The composition according to claim 1, said diluent being selected from the group consisting of mono-functional acrylic monomers different from said mono-functional monomer, vinylpyrrolidone. N-vinylcaprolactam, and combinations thereof.

5. The composition according to claim 1, said acrylic polymer or copolymer being present in said ink at a level of about 1% to about 20% by weight based on the total weight of the ink.

6. The composition according to claim 1, said mono-functional monomer being present in said ink at a level of about 15% to about 85% by weight based on the total weight of the ink.

7. The composition according to claim 1, said diluent being present in said ink at a level of about 5% to about 25% by weight.

8. A method of forming a molded, three-dimensional object containing a digitally printed image thereon comprising:
   providing a substantially flat, unmolded substrate comprising a synthetic resin material;
   digitally printing an image onto said substrate using an ink comprising an acrylic polymer or copolymer having an average molecular weight of between about 2,500 to about 25,000 g/mole, a mono-functional monomer having a molecular weight of between about 100 to about 600 g/mole, a diluent, and a pigment, said ink being without a separately added solvent;
   curing the ink composition on the substrate, wherein curing bonds the ink composition to the substrate; and
   molding at least a portion of said substrate containing said image into a molded article, said ink elongating during molding of said substrate thereby preventing the formation of cracks in said image, wherein said molding results in continuous elongation of at least a portion of said ink image by 100% to 900%.

9. The method according to claim 8, said substrate being rigid at 25° C.

10. The method according to claim 8, said substrate comprising at least one synthetic resin material selected from the group consisting of acrylonitrile butadiene styrene (ABS), styrenes, polystyrenes, cast acrylics, extruded acrylics, polycarbonates, polyethylenes, polypropylenes, polyesters, co-extruded polyesters, glycolized polyester (PETG). amorphous polyethylene terephthalate (APET), rigid vinyls, and polyvinyl chlorides.

11. The method according to claim 8, said molding step comprising heating said substrate to a temperature above the glass-transition temperature of said synthetic resin material thereby rendering the substrate pliable and then forming said substrate into said three-dimensional object.

12. The method according to claim 11, said molding step comprising forming said three-dimensional object using an apparatus selected from the group consisting of vacuum-forming equipment, heat-bending equipment, and heat-folding equipment.

13. A molded object having an image digitally printed thereon comprising:
   a moldable substrate formed from a synthetic resin material; and
   an image printed on said substrate with a digital ink, said ink comprising an acrylic polymer or copolymer having an average molecular weight of between about 2,500 to about 25,000 g/mole, a mono-functional monomer having a molecular weight of between about 100 to about 600 g/mold, a diluent, and a pigment, said ink being without a separately added solvent,
   at least a portion of said substrate with said digital ink printed thereon being molded to assume a three-dimensional shape without said ink exhibiting any cracking visible to the naked eye, at least a portion of said ink image undergoing continuous elongation by 100% to 900% during molding of said substrate to assume the three-dimensional shape.

* * * * *